(12) United States Patent
Niemann et al.

(10) Patent No.: US 12,358,467 B2
(45) Date of Patent: Jul. 15, 2025

(54) METHOD FOR DETECTING LIQUID ON A WINDOWPANE

(71) Applicant: HELLA GmbH & Co. KGaA, Lippstadt (DE)

(72) Inventors: Thomas Niemann, Delmenhorst (DE); Dirk Jegminat, Bremen (DE); Oliver Wilhelm, Stuhr (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 154 days.

(21) Appl. No.: 18/456,345

(22) Filed: Aug. 25, 2023

(65) Prior Publication Data
US 2024/0067131 A1     Feb. 29, 2024

(30) Foreign Application Priority Data
Aug. 26, 2022   (DE) .......................... 102022121688.8

(51) Int. Cl.
*B60S 1/08*     (2006.01)
*G01V 8/12*     (2006.01)

(52) U.S. Cl.
CPC .............. *B60S 1/0833* (2013.01); *G01V 8/12* (2013.01)

(58) Field of Classification Search
CPC ....... B60S 1/0833; B60S 1/0837; G01V 8/12; G01N 21/552; G01N 2021/9586; G01N 21/55; G01N 2021/555; G01W 1/14
See application file for complete search history.

(56) References Cited

U.S. PATENT DOCUMENTS

| | | | |
|---|---|---|---|
| 5,453,670 A | * | 9/1995 | Schaefer ............... B60S 1/0818 318/DIG. 2 |
| 5,760,559 A | | 6/1998 | Pientka et al. |

(Continued)

FOREIGN PATENT DOCUMENTS

| | | |
|---|---|---|
| DE | 3314770 A1 | 10/1984 |
| DE | 19526249 A1 | 2/1996 |

(Continued)

*Primary Examiner* — Tony Ko
(74) *Attorney, Agent, or Firm* — MUNCY, GEISSLER, OLDS & LOWE, P.C.

(57) ABSTRACT

A method for detecting liquid on a windowpane in which radiation is emitted by at least one radiation emitter, the radiation is coupled into the windowpane via at least one optical element, and, after reflection in the windowpane, the radiation is coupled out of the windowpane. The radiation which is coupled out of the windowpane is captured in single measurements. A measurement cycle is formed from a multiplicity of single measurements. An average value is calculated from the measurement results of a measurement cycle. The average value is used a reference value for the single measurements of the subsequent measurement cycle currently in progress. The differences between the measured values of the single measurements of a measurement cycle currently in progress and the reference value are determined. The differences between the measured values of the single measurements of the measurement cycle currently in progress and the reference value are evaluated statistically. A conclusion is drawn regarding the state of coverage with liquid of the measuring section on the windowpane from the statistical evaluation.

12 Claims, 1 Drawing Sheet

(56) References Cited

U.S. PATENT DOCUMENTS

| | | | |
|---|---|---|---|
| 6,118,383 | A | 9/2000 | Hegyi |
| 6,175,205 | B1 | 1/2001 | Michenfelder et al. |
| 2006/0163458 | A1* | 7/2006 | Reime .................... G06V 20/56 |
| | | | 250/227.25 |

FOREIGN PATENT DOCUMENTS

| | | |
|---|---|---|
| DE | 19519891 A1 | 12/1996 |
| DE | 19713835 A1 | 10/1998 |
| DE | 69432588 T2 | 4/2004 |

* cited by examiner

METHOD FOR DETECTING LIQUID ON A WINDOWPANE

BACKGROUND OF THE INVENTION

Field of the Invention

The invention relates to a method for detecting liquid on a windowpane, in particular a window of a motor vehicle, wherein radiation is emitted by at least one radiation emitter, wherein the radiation is coupled into the windowpane via at least one optical element, and wherein after reflection in the windowpane the radiation is coupled out of the windowpane, and is directed via at least one optical element to a radiation receiver, and wherein at least one measuring section is formed for detecting the liquid on the windowpane by the reflections of the radiation in the windowpane.

Brief Description of the Related Art

Methods for detecting liquid, precipitation on a windowpane for example, on a windscreen of a motor vehicle for example, are used in many motor vehicles. In order to detect the moisture on the windscreen, a radiation emitter may be used which emits a radiation signal, in particular an infrared radiation signal. The radiation emitter may be a light emitting diode or similar, for example. The radiation may be coupled into the windscreen by means of an optical element. The optical element may be for example a radiolucent lens body or the like. The radiation that is coupled into the windowpane may be totally reflected inside the windowpane at the boundary surfaces of the windowpane with the environment, and coupled out of the windowpane again after passing through a measuring section. The radiation coupled out of the windowpane may be directed via a further optical element to a radiation receiver, by which it is detected. The magnitude of the fraction of total reflections in the windowpane may be determined based on the fraction of the radiation that is coupled out again. The fraction of total reflections in the windowpane is influenced by the degree to which the windowpane is made wet with liquid. In the regions of the measuring sections in which the windowpane is coated with liquid, total reflection does not take place, instead the radiation is coupled out of the windowpane, with the result that the fraction of totally reflected light is reduced by the wetted regions. This may be detected for example by capturing the radiation intensity of the radiation that is coupled out via the optical element. The measurement principle is known from DE 195 26 249 A1, for example.

The most common drawback with known methods is that changes in the liquid state, such as decreasing rainfall, can only be recognised subsequently.

SUMMARY OF THE INVENTION

The problem addressed by the invention is that of suggesting a method for detecting liquid on a windowpane with which it is possible distinguish whether the windowpane is wetted evenly with moisture or in large drops, and with which it is possible to rapidly detect changing states of wetness.

This problem is solved with a method having the features of the independent claim(s). Further developments and advantageous variants are presented in the subordinate claim (s).

In a method for detecting liquid on a windowpane, in particular on a motor vehicle windowpane, wherein radiation is emitted by at least one radiation emitter, wherein the radiation is coupled into the windowpane via a least one optical element, and wherein the radiation is coupled out of the windowpane again after reflection in the windowpane and is directed to a radiation receiver via at least one optical element, and wherein at least one measuring section for detecting the liquid on the windowpane is created by the reflections of the radiation in the windowpane, it is provided as essential to the invention that the radiation which is coupled out of the windowpane and directed to the at least one radiation receiver is captured in single measurements, that a measurement cycle is formed from a multiplicity of single measurements, that an average value is calculated from the measurement results of the single measurements of a measurement cycle, that the average value of a measurement cycle is used a reference value for the single measurements of the subsequent measurement cycle currently in progress, that the differences between the measured values of the single measurements of a measurement cycle currently in progress and the reference value are determined, and that the differences between the measured values of the single measurements of the measurement cycle currently in progress and the reference value are evaluated statistically, and that a conclusion is drawn regarding the state of coverage with liquid on the measuring section on the windowpane from the statistical evaluation.

The radiation coupled out of the windowpane by an optical element, that is to say the totally reflected radiation in the windowpane that was emitted by the radiation emitter, is detected by means of at least one radiation receiver. The radiation emitter may be an LED, for example, in particular an infrared LED. In this context, the radiation may consist of individual radiation pulses that are emitted by the LED. The ideally pulsed radiation is thus captured in the form of single measurements, wherein the radiation intensity is detected. A plurality of single measurements, or the single measurements in a period of time, may be combined as a measurement cycle. An average value is formed from the measurement results of the single measurements within a measurement cycle. In this context, the length of the measurement cycle and the number of single measurements in a measurement cycle may be varied depending on the application. The average value of the measurement results of the single measurements in a measurement cycle serves as a reference value for the subsequent single measurements of the subsequent measurement cycle, that is to say the one currently in progress. The measurement results of the single measurements following a measurement cycle are each compared with this average value, and the differences between the measured values of the single measurements and the reference value are determined. Ideally, the magnitudes of the differences between the single measurements of the measurement cycle currently in progress and the reference value of the preceding measurement cycle are captured and evaluated statistically. In particular, the differences are classified in difference classes according to their magnitude. The number of entries in each difference class, that is to say the number of single measurements assigned to each difference class, is evaluated. Both positive and negative difference magnitudes are captured. A conclusion may be drawn regarding changes in the state of wetness, i.e., a change in the liquid deposits on the window pane in the region of the measuring section from the evaluation of the difference classes, for example the number of entries therein. In particular, multiple measuring sections may also be used, wherein one radiation source and one radiation receiver is assigned to each measuring section. In this situation, not only may each measuring section have its own radiation emitter and radiation receiver. It may further be provided that radiation from the same radiation emitter may be coupled into multiple measuring sections. Equally, it may be provided that the detection surface for detecting liquid on the windowpane consists of a multiplicity of individual segments, wherein for example the radiation of the radiation emitter is divided into individual radiation bundles, with the result that the irradiation of the measuring section in the windowpane takes place in segmented manner. Measured radiation intensity value may be captured independently of each other for each radiation bundle, in particular for each radiation pulse of the radiation bundle, with the aid of respectively assigned radiation receivers. The differences between the measurement results of the single measurements of the radiation bundle and the reference value are captured and evaluated. The comparisons of the single measurements recorded at high frequency with the reference value enable rapid detection of changes in the state of the moisture on the windowpane.

In a further development of the method, the differences between the current measured values of the single measurements in the measurement cycle currently in progress and the reference value are assigned to different classes according to their magnitudes, and evaluated statistically. The single measurements of a complete measurement cycle are calculated and used as the reference for the single measurements of the subsequent measurement cycle. This means that the measured values of the single measurements of the subsequent measurement cycle are compared with the reference value. The respective magnitudes of the differences between the single measurements of the measurement cycle currently in progress and the reference value are evaluated statistically. In this process, particularly the differences between the single measurements and the reference value are classified in difference classes according to their magnitude, or the single measurement results are classified in difference classes according to the magnitude of their difference. Through the statistical evaluation of the number of entries in each difference class, even small changes in the state of coverage of the windowpane with liquid can be detected.

In a further development of the method, the number of individual differences per difference class is captured and evaluated. The differences between the measured values of the single measurements in a measurement cycle currently in progress and the reference value obtained from the average value of the measured values from the previous measurement cycle are sorted into various difference classes according to their magnitude. For example, the single measurement results are classified in difference classes according to the magnitude of their difference from the reference value, and the number of entries per difference class is evaluated. In particular, in this context nine different difference classes, ranging from large differences to small differences, may be used. The number of entries per difference class, i.e., the number of individual differences assigned to each difference class is captured. From the number of entries per difference class, a conclusion is drawn in particular regarding a change in state of the moisture on the windowpane being monitored, for example a windowpane that is becoming drier.

In a further development of the method, the largest differences between the measured values of the single measurements of the measurement cycle currently in progress and the reference value, and/or the second largest differences between the measured values of the single measurements of the measurement cycle currently in progress and the reference value, and/or the average differences between the measured values of the single measurements of the measurement cycle currently in progress and the reference value are evaluated statistically. The single measurements of the measurement cycle currently in progress are recorded at high frequency. The single measurements within a measurement cycle may be taken at equally spaced time intervals. The recording frequency may be 3.3 kHz. The differences of the single measurements in the current measurement cycle from the reference value are classified in different difference classes according to their magnitude, and evaluated. In this context, for example, the greatest differences between the single measurements and the reference values, the second largest differences and the average differences are captured. However, other difference classes may also be envisaged. The differences captured and counted in different classes according to their magnitudes. The totals, that is to say the number of entries in each difference class of a measurement cycle, is evaluated. If in the comparison between the difference classes in the measurement cycle currently being evaluated, the most entries are present in the difference class for the largest differences, this is a sign of a change in state of the moisture on the window surface, indicating for example that precipitation is becoming heavier or lighter. The statistical evaluation of the largest and second largest differences enables even small changes in the moisture state on the windowpane to be detected.

In one embodiment of the method, the magnitudes of the differences between the single measurement results and the reference value are divided into nine difference classes. Classification in nine difference classes makes it possible to detect changes in state of the liquid on the windowpane to be monitored very precisely.

In one embodiment of the method, a substantially even distribution of the number of determined differences in the difference classes leads to the conclusion of a uniform coverage of the windowpane with moisture. A very fine, even covering on the windowpane, called "spray", in the region of the measuring section is indicated by a considerably different distribution of the number of entries in the various difference classes than is the case when large drops are present on the windowpane, for example. When the windowpane is covered evenly, the entries for the measurement results or for the differences are relatively evenly distributed in the difference classes. In such a context, the classes of large differences may contain fewer entries than medium-sized and small differences. Through the statistical evaluation of the entries in the difference classes, it is thus possible to distinguish between a fine coating of moisture and large drops on the windscreen.

In one embodiment of the method, in which a relatively larger number of detected differences is detected in the difference classes of larger differences compared with the number of detected differences in the difference classes of smaller differences, a conclusion is drawn regarding individual drops on the measuring section. When a larger number of entries is assigned to difference classes of large differences than to the difference classes of smaller differences, it can be concluded that single drops are present on the measuring section on the windowpane that is being monitored. Thus, for the measured values of the measurement cycle currently in progress there are large differences from the reference value in some single measurements in particular in the regions where drops are present, whereas only small differences are detected sporadically in the regions where no drops are present.

In a further development of the method, at least one measuring section on the windowpane is located in a region that is swept by a wiper blade. At least one measuring section of the sensor apparatus used to carry out the method, ideally all measuring sections, is/are located on the windowpane in a region that is swept by a wiper blade, that is to say a windscreen wiper. An arrangement in a region that is swept by a wiper blade enables the sweeping operations to be captured by the statistical evaluation of the measurement results, for example the sweeping operations may be used to detect changes in the state of the moisture on the windowpane. In particular, the fact that the wiping of a moist windscreen at least temporarily places the measuring section in a dry state may be exploited during detection. This occasionally reduced quantity of water on the windowpane is revealed by a greater fraction of total reflections and thus also in increased coupling out of the radiation to the radiation receiver. This is manifested in large differences in the single measurements compared with the average value of the previous measurement cycle. The detection of the regions on the windscreen dried by the windscreen wipers enables targeted control of the windscreen wipers, particularly as the amount of moisture on the windowpane decreases.

In one embodiment of the invention, with the greatest number of entries in the difference class of the largest detected differences and/or in the difference class of the second largest detected differences of a measurement cycle, a conclusion is drawn about wiping of the measuring section with a wiper blade with moisture on the windowpane. The differences between the measured values of the single measurements of a measurement cycle in progress and the reference value obtained from the previous measurement cycle are classified according to their magnitude, and their number per class is evaluated. In a statistical evaluation, accumulations of the differences in the class of the largest differences and/or the class of the second largest differences can be detected in the measurement cycle. Increased coupling out of the radiation to the radiation receiver, which is manifested in a large difference between the single measurement and the average value of the previous measurement cycle, indicates a windowpane that has been at least temporarily dried off by the wiper blade. This information can be incorporated in the actuation of the windscreen wiper system, wherein the windscreen wiper speed may be adjusted particularly as the quantity of moisture on the windowpane decreases or the quantity of moisture on the windowpane increases.

In a further development of the method, at least one measuring section is swept twice by a wiper blade, the sweeps are made consecutively, and when the largest number of entries during the first pass is detected in the difference classes of the largest and/or second largest differences, and no entries are detected in the difference classes of the largest and/or second largest differences are detected during the second pass, the conclusion is drawn to the effect that the windowpane is drying. The measuring section may be wiped by a windscreen wiper for example once during the upward sweep and once during the downward sweep thereof in the course of a wiping operation. In the case of a drying windowpane, a quantity of moisture may still be swept ahead of the wiper during the first pass, thereby drying the windowpane, resulting in a high number of detected largest and second largest differences in the statistical evaluation. There are differences between the dried windowpane and the previous moist state. Now if no more entries in the largest difference classes are detected during the second pass, it may be assumed that the windowpane is mostly dry, and the wiper speed can be adjusted accordingly. The windowpane remains dry after wiping, so that no large differences occur between the single measurements and the average value.

In a further development of the method, the current measured values of the coupled out radiation are recorded with a high frequency. Recording the measurement results of the single measurements in the measurement cycle currently in progress at a high frequency of 3.3 kHz for example makes it possible to rapidly detect the state of wetness on the windowpane.

In a further development of the method, individual detection points are created on the windowpane by the coupled in radiation, the measured values of the coupled out radiation for the detection points are captured and evaluated independently of each other. Each measuring section consists of a number of individual illumination points on the windscreen. For this purpose, the radiation emitted by a radiation source is split into individual partial beams, i.e., beam bundles, and directed at the windscreen. The detection surface on the windscreen on which drops of liquid can be detected, thus consists of individual illumination points arranged side by side for each measuring sections. The individual partial beams reflected in the windowpane can be captured independently of each other. The independent detection and formation of the difference values compared to the reference value derived from the previous measurement cycle makes it possible to capture large and small drops on the windowpane, for example. This is enabled in particular by the analysis of the set of individual signals from all segments of a measuring section at the same point in time. It also becomes possible to detect the wiping of the measuring section with a wiper blade by evaluating the measured values of the individual measurement points or their difference form the reference value.

BRIEF DESCRIPTION OF THE DRAWINGS

In the following text, the invention will be explained further with reference to an embodiment illustrated in greater detail in the drawing. In the drawing, the individual figures show.

DETAILED DESCRIPTION OF THE PREFERRED EMBODIMENTS

Figure 1:
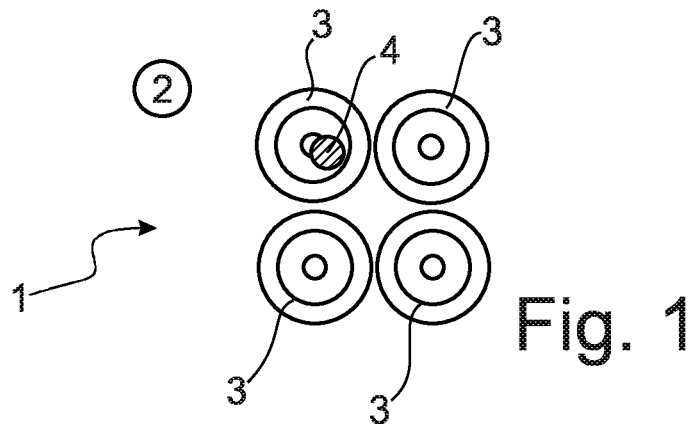
FIG. 1 illustrates a small drop on a segmented measuring section.

FIG. 1 represents a detection surface 1 or section of the detection surface on the windowpane 2 of a motor vehicle. The detection surface 1 consists of individual detection points 3. Each detection point 3 is created on the windowpane 2 by a partial beam of the radiation emitted by the radiation emitter. Shown here is the covering of a detection point 3 by a relatively small drop of water 4, which influences the coupling out of the windowpane of just one detection point 3. In this way, a conclusion may be drawn regarding the size of the drop of moisture on the windowpane 2 by the independent detection of the individual detection points 3.

Figure 2:
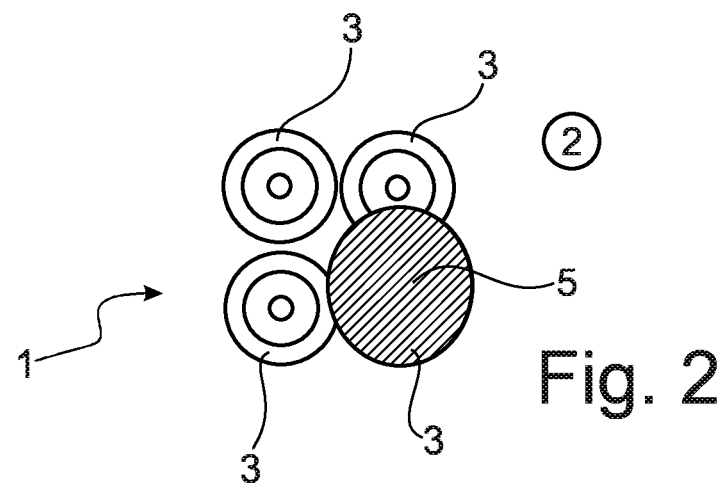
FIG. 2 illustrates a large drop on a segmented measuring section.

FIG. 2 represents a detection surface 1 according to FIG. 1, in which three detection points 3 are at least partially covered by a relatively large drop of water 5. By detection of the coupling out on the windowpane 2 at multiple detection points 3, it may be concluded that several detection points 3 are obscured by the same drop of water 5, enabling the size and position of the drop of water 5 to be determined.

Figure 3:
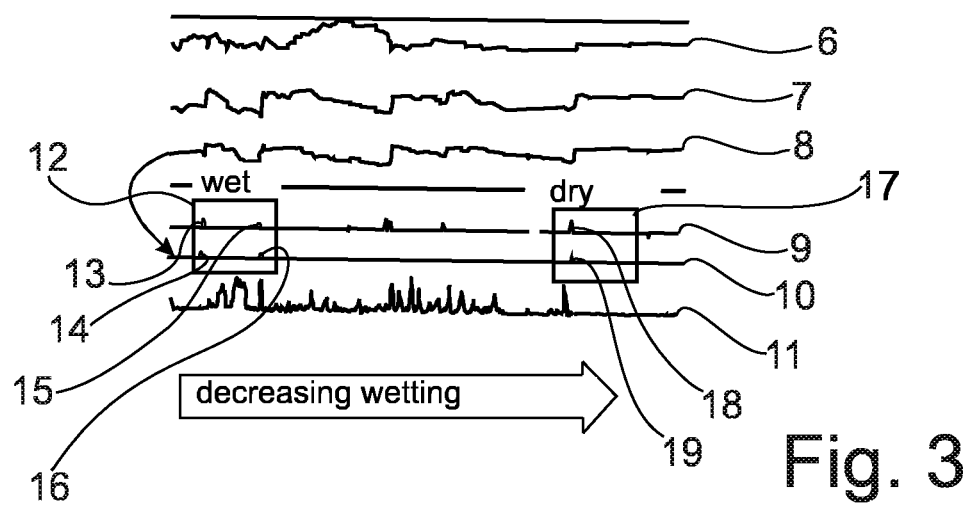
FIG. 3 illustrates signal paths of the measuring sections when wiping with windscreen wipers and the time curve of the measurement value signals from three measuring sections.

FIG. 3 represents the time curve of the measurement value signals from three measuring sections 6, 7 and 8. The radiation reflected in the windowpane 2, that is to say the radiation intensity of the radiation reflected and captured by the radiation receivers over time is shown for the three measuring sections 6, 7, 8, on the Y-axis for each. In this context, the X-axis corresponds to the time axis. The signals 9, 10, 11 show examples of the statistical evaluation for the measuring section 8. Here, the Y-axis corresponds to the number of entries in the respective difference class. In signal 9, the number of the largest differences between the single measurements and the reference value, i.e., the number of entries in this difference class, is presented. The reference value is given by the average value of the single measurements of the last completed measurement cycle. In signal 10, the number of entries in the difference class of the second largest differences of the single measurements compared with the reference value is shown. In Signal 11, the number of the entries in the difference class of the average differences of the single measurements from the current measurement cycle compared with the reference value is shown. Most of the entries 13 and 14 in the difference classes 9 and 10 of the largest and second largest differences compared with the reference value occur in a section 12. The entries 13 and 14 arise from a sweep of the measuring section 8 by a windscreen wiper. The measuring section 8 is at least partly dried off by the windscreen wiper. This leads to an increased number of total reflections in the windowpane and consequently increased radiation intensity on the sensor. The result of this is that due to the intermittently dry windowpane large differences between the single measurements and the reference value arise. Entries 15 and 16 are also shown in section 12, and these are generated by a second sweep, in a downward motion of the windscreen wiper, for example. Only entries 18 and 19 are visible in section, these are the result of wiping with a windscreen wiper. In section 17 there are no further entries suggesting a repeated sweep. It may therefore be concluded that the windowpane 2 is drying, so that when a further sweep is made over the measuring section 8, no large differences will be detected in the single measurements, as the measuring section remains dry. In this way, a drying windowpane 2 can be detected rapidly, so that the control of the wiping operation can be adapted.

The invention claimed is:

1. A method for detecting liquid on a windowpane, in particular on a windowpane of a motor vehicle, wherein radiation is emitted by at least one radiation emitter, wherein the radiation is coupled into the windowpane via at least one optical element, and wherein after reflection in the windowpane the radiation is coupled out of the windowpane, and is directed via at least one optical element to a radiation receiver, and wherein at least one measuring section is formed for detecting the liquid on the windowpane by the reflections of the radiation in the windowpane, wherein
the radiation coupled out of the windowpane and directed at the at least one radiation receiver is detected in single measurements,
a measurement cycle is formed from a plurality of single measurements,
an average value is formed from the measurement results of the single measurements of a measurement cycle, the average value of a measurement cycle is used as the reference value for the single measurements of the subsequent measurement cycle, currently in progress,
the differences between the measured values of the single measurements of a measurement cycle currently in progress and the reference value are determined, and
the differences between the measured values of the single measurements of the measurement cycle currently in progress and the reference value are evaluated statistically, and
a conclusion is drawn regarding the condition of wetness with liquid on the measuring section on the windowpane from the statistical evaluation.

2. The method according to claim 1, wherein the differences between the current measured values for the single measurements of the measurement cycle currently in progress and the reference value are assigned to difference classes according to their magnitudes and evaluated statistically.

3. The method according to claim 2, wherein the number of individual differences for each difference class is captured and evaluated.

4. The method according to claim 3, wherein the largest differences between the measured values of the single measurements of the measurement cycle currently in progress and the reference value, and/or the second largest differences between the measured values of the single measurements of measurement cycle currently in progress and the reference value and/or the average differences between the measured values of the single measurements of the measurement cycle currently in progress and the reference value are evaluated statistically.

5. The method according to claim 4, wherein the magnitudes of the differences of the single measurement results compared with the reference value are classified in nine difference classes.

6. The method according to claim 5, wherein a substantially even distribution of the number of determined differences in the difference classes leads to the conclusion of a uniform coverage of the windowpane with moisture.

7. The method according to claim 5, wherein a relatively large number of detected differences in the difference classes of larger differences compared with the number of detected differences in the difference classes of smaller differences leads to the conclusion of single drops on the measuring section.

8. The method according to claim 1, wherein at least one measuring section on the windowpane is arranged in a region that is swept by a wiper blade.

9. The method according to claim 8, wherein the largest number of an entries in the difference class of the largest detected differences and/or in the difference class of the second largest detected differences in a measurement cycle lead to a conclusion that the measuring section is swept with a wiper blade while moisture is on the windowpane.

10. The method according to claim 8, wherein at least one measuring section is wiped twice by at least one wiper blade, that the sweeps take place consecutively, and that detection of the largest number of entries is detected in the difference classes of the largest and/or second largest detected differences during the first sweep, and detection of no entries in the difference classes of the largest and/or second largest detected differences during the second sweep leads to the conclusion that the windowpane is drying.

11. The method according to claim 1, wherein the current measured values of the coupled out radiation are recorded with a high frequency.

12. The method according to claim 1, wherein individual detection points are created on the windowpane by means of the coupled in radiation and form the detection surface, that the measured values of the coupled out radiation are captured and evaluated independently of each other for the detection points.

\* \* \* \* \*